(12) United States Patent
Harrison et al.

(10) Patent No.: US 7,170,617 B1
(45) Date of Patent: Jan. 30, 2007

(54) METHOD AND APPARATUS FOR DETERMINING HOW TO PROCESS INCOMING PRINT JOBS

(75) Inventors: Karen L. Harrison, Longmont, CO (US); Charles David Johnson, Boulder, CO (US); Larry David Teklits, Loveland, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/550,669

(22) Filed: Apr. 17, 2000

(51) Int. Cl.
*G06F 15/00* (2006.01)
*G06K 1/00* (2006.01)

(52) U.S. Cl. ...................... 358/1.15; 358/1.9
(58) Field of Classification Search .............. 358/1.1, 358/1.9–1.11; 710/72, 12, 3, 33
See application file for complete search history.

(56) References Cited

U.S. PATENT DOCUMENTS

| | | | |
|---|---|---|---|
| 5,566,278 A | 10/1996 | Patel et al. | |
| 5,602,974 A | 2/1997 | Shaw et al. | |
| 5,638,497 A | 6/1997 | Kimber et al. | |
| 5,740,028 A | 4/1998 | Sugiyama et al. | |
| 5,781,711 A | 7/1998 | Austin et al. | |
| 5,787,237 A | 7/1998 | Reilly | |
| 5,791,790 A | 8/1998 | Bender et al. | |
| 5,859,956 A | 1/1999 | Sugiyama et al. | |
| 5,873,659 A | 2/1999 | Edwards et al. | |
| 5,898,823 A | 4/1999 | Sorkin et al. | |
| 5,946,458 A | 8/1999 | Austin et al. | |
| 5,978,560 A | 11/1999 | Tan et al. | |
| 5,995,720 A | 11/1999 | Sakurai et al. | |
| 5,996,029 A | 11/1999 | Sugiyama et al. | |
| 6,006,284 A | 12/1999 | Cockroft | |
| 6,020,973 A | 2/2000 | Levine et al. | |
| 6,552,813 B2 * | 4/2003 | Yacoub | 358/1.1 |
| 6,606,163 B1 * | 8/2003 | Suzuki et al. | 358/1.15 |
| 6,734,986 B1 * | 5/2004 | Kuroi et al. | 358/1.16 |
| 2002/0016921 A1 * | 2/2002 | Olsen et al. | 713/200 |

FOREIGN PATENT DOCUMENTS

| | | | |
|---|---|---|---|
| JP | 11110163 A | * | 4/1999 |
| JP | 411110163 A | * | 4/1999 |

* cited by examiner

*Primary Examiner*—Gabriel Garcia
*Assistant Examiner*—Thierry L. Pham
(74) *Attorney, Agent, or Firm*—David W. Lynch; Chambliss, Bahner & Stophel P.C.

(57) ABSTRACT

The present invention efficiently directs the flow of print jobs and efficiently controls the spooling and printing of print jobs. The multiplexer system analyzes jobs received from client systems through print channels. The multiplexer determines the attributes of the incoming job and the attributes associated with the print channel. If the attributes of the print job and the attributes of the print channel dictate an output path (either MUST PRINT or MUST SPOOL), then the multiplexer examines the state of the selected path. If the designated output path (printer or spooler) is busy, then the multiplexer decision is to signal a Stop_Flow to the print channel. The print channel is signaled to Start_Flow at a later time, when the output path becomes available. If the attributes of the print job and the attributes of the print channel do not dictate an output path, then the multiplexer examines a User Output Selection setting to control spooling and printing of print jobs.

33 Claims, 4 Drawing Sheets

METHOD AND APPARATUS FOR DETERMINING HOW TO PROCESS INCOMING PRINT JOBS

BACKGROUND OF THE INVENTION

1. Field of the Invention

This invention relates in general to a printing systems, and more particularly to a method and apparatus for determining how to process incoming print jobs.

2. Description of Related Art

Printers receive print data from a source, such as a single host computer or from a network that contains at least one host computer or network server. One recent development with respect to laser printers is the addition of a "memory option," which is an internal memory device such as flash RAM (Random Access Memory) or a hard disk drive, in which each type of memory can store files containing printed data. In some conventional printers, the memory device (e.g., hard disk) is of a sufficient size to store many print jobs at one time. Moreover, the "normal" temporary memory storage device (i.e., typically volatile RAM) used to store incoming print jobs may also be of a sufficient size to store many print jobs at one time, even as the printer is in the process of printing an earlier-received print job.

In typical desktop personal computer (PC) environments, print jobs are submitted (via either a direct connection or via a network) to a printer that contains sufficient memory to accept more than one entire print job, and by using this capability, a quick "screen release" is achieved. The term "screen release" represents the concept that, once a print job is accepted by a printer, the desk top PC is "released" by that printer, and the PC is no longer waiting for the printer to continue accepting the data. Until conventional printers accept all of the data for a particular print job from the host computer (i.e., the PC), the host computer can be unusable by its human user ("locked up") until the active printing session is complete. An active printing session becomes "complete" generally when the print job has been completely accepted by the printer. At that time, the printer's hardware communicates to the host PC's hardware that the job has been accepted.

The desire to achieve a quick screen release has produced various solutions in the printer field of art. One conventional solution is to implement a "print spooler" in various operating systems, including PC operating systems (e.g., Microsoft Windows 95™, IBM OS/2™), as well as network operating systems (e.g., Novell Netware™, and IBM LAN Server™). Another conventional solution is to add more memory to the printers so as to allow the printers to completely accept various print jobs long before they are physically printed.

In addition, a printer may contain one or more attachments over which print data is received. Attachments may be physical or logical. Examples of attachments are Ethernet, Twinax, Parallel port, and the despooler. Attachments represent a subset of a more abstract entity called a data channel. Print data is passed through a data channel to the multiplexer. Data channels may be recognized as common methods of printing. Examples of data channels include LPD (a printing protocol of TCP/IP), IPP (a new printing protocol of TCP/IP), Pserver (a printing service of Novell NetWare), and Appletalk (a Macintosh communications protocol).

In a printer, a hard disk may be used as a spooling device, or for other uses. When used as a device to hold spooled jobs, some mechanism is required for dynamically determining how to process an incoming job. In general, an incoming job may be directed to the hard disk (spooled), or it may be directed to the print engine, or the transmission of job data may be temporally suspended. Some types of jobs, and some print channels, do not work correctly when a job is directed to the spooler. Other jobs or data channels do not work correctly when a job is send directly to the print engine. Additionally, there are conditions under which it is necessary to temporarily suspend the processing of a new job.

There have been some attempts to control spooling of print jobs. However, these have been unsophisticated. Current controllers do not have the capability of examining the attributes of a print job, configuration parameters or other data to decide how to process a print job.

It can be seen that there is a need for a method and apparatus for determining how to process incoming print jobs.

It can also be seen that there is a need for a method and apparatus for examining data in the incoming job and processing the attributes of the job, configuration parameters in the printer and the state of the printer engine and spooler to determine how to process the incoming print jobs.

SUMMARY OF THE INVENTION

To overcome the limitations in the prior art described above, and to overcome other limitations that will become apparent upon reading and understanding the present specification, the present invention discloses a method and apparatus for determining how to process incoming print jobs.

The present invention solves the above-described problems by examining data in the incoming job and processing the attributes of the job, configuration parameters in the printer and the state of the printer engine and spooler to determine how to process the incoming print jobs.

A method in accordance with the principles of the present invention includes determining job description attributes of an incoming print job, determining attributes of a print channel associated with the incoming print job and processing the incoming print job based upon the attributes of the print channel and the job description attributes of the incoming print job.

Other embodiments of a method in accordance with the principles of the invention may include alternative or optional additional aspects. One such aspect of the present invention is that the processing further includes determining whether the job description attributes and the print channel attributes dictate an output path, analyzing a state for a dictated output path when the job description attributes and the print channel attributes dictate an output path and routing the incoming print job to the dictated path when the state of the dictated path is free.

Another aspect of the present invention is that the method further includes signaling a stop flow command to halt the incoming print job when the state of the dictated path is busy.

Another aspect of the present invention is that the method further includes restarting the incoming print job when the dictated path becomes available.

Another aspect of the present invention is that the method further includes evaluating a setting for a user output selection when the job description attributes and the print channel attributes do not dictate an output path and processing the incoming print job based upon the setting for the user output selection.

Another aspect of the present invention is that the method further includes printing the incoming print job when the incoming print job is not required to be spooled because of the job description attributes or the print channel attributes and the setting of the user output selection is PRINT ALL, spooling the incoming print job when the incoming print job is not required to be printed because of the job description attributes or the print channel attributes and the setting of the user output selection is SPOOL ALL, printing the incoming print job when the printer is available, the incoming print job is not required to be printed because of the job description attributes or the print channel attributes and the setting of the user output selection is SPOOL WHEN BUSY and spooling the incoming print job when the printer is busy, the incoming print job is not required to be printed because of the job description attributes or the print channel attributes and the setting of the user output selection is SPOOL WHEN BUSY.

Other embodiments of the present invention includes an article of manufacture comprising a program storage medium readable by a computer, the medium tangibly embodying one or more programs of instructions executable by the computer to perform a method for processing incoming print jobs, a multiplexer and a print system that includes a multiplexer that processes incoming print jobs according to the present invention. The multiplexer includes, inter alia, a multiplexer interface for determining attributes of a print channel associated with an incoming print job and receiving job description attributes of the incoming print job from the print channel and a multiplexer processor component, interfaced with the multiplexer interface, for managing the routing of the incoming print job based upon the attributes of the print channel and the job description attributes of the incoming print job. The print system includes a print engine, a spooler and a system controller having the multiplexing functions as described above.

The present invention examines data in the incoming job and processes the attributes of the job, configuration parameters in the printer and the state of the printer engine and spooler to determine how to process the incoming print jobs. The multiplexer system is provided for analyzing jobs received from client systems through print channels. The multiplexer determines the attributes of the incoming job. The multiplexer also examines the attributes associated with the print channel. If the attributes of the print job and the attributes of the print channel dictate an output path (either MUST PRINT or MUST SPOOL), then the multiplexer examines the state of the selected path. If the designated output path (printer or spooler) is busy, then the multiplexer decision is to signal a Stop_Flow to the print channel. The print channel is signaled to Start_Flow at a later time, when the output path becomes available. If the attributes of the print job and the attributes of the print channel do not dictate an output path, then the multiplexer examines the User Output Selection setting. This setting allows the administrator to control spooling for jobs that are not required to be sent direct to the printer or to the spooler. Thus, the multiplexer can efficiently direct the flow of print jobs and efficiently control the spooling and printing of print jobs.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for determining how to process incoming print jobs. The present invention examines data in the incoming job and processes the attributes of the job, configuration parameters in the printer and the state of the printer engine and spooler to determine how to route the incoming print jobs.

Figure 1:
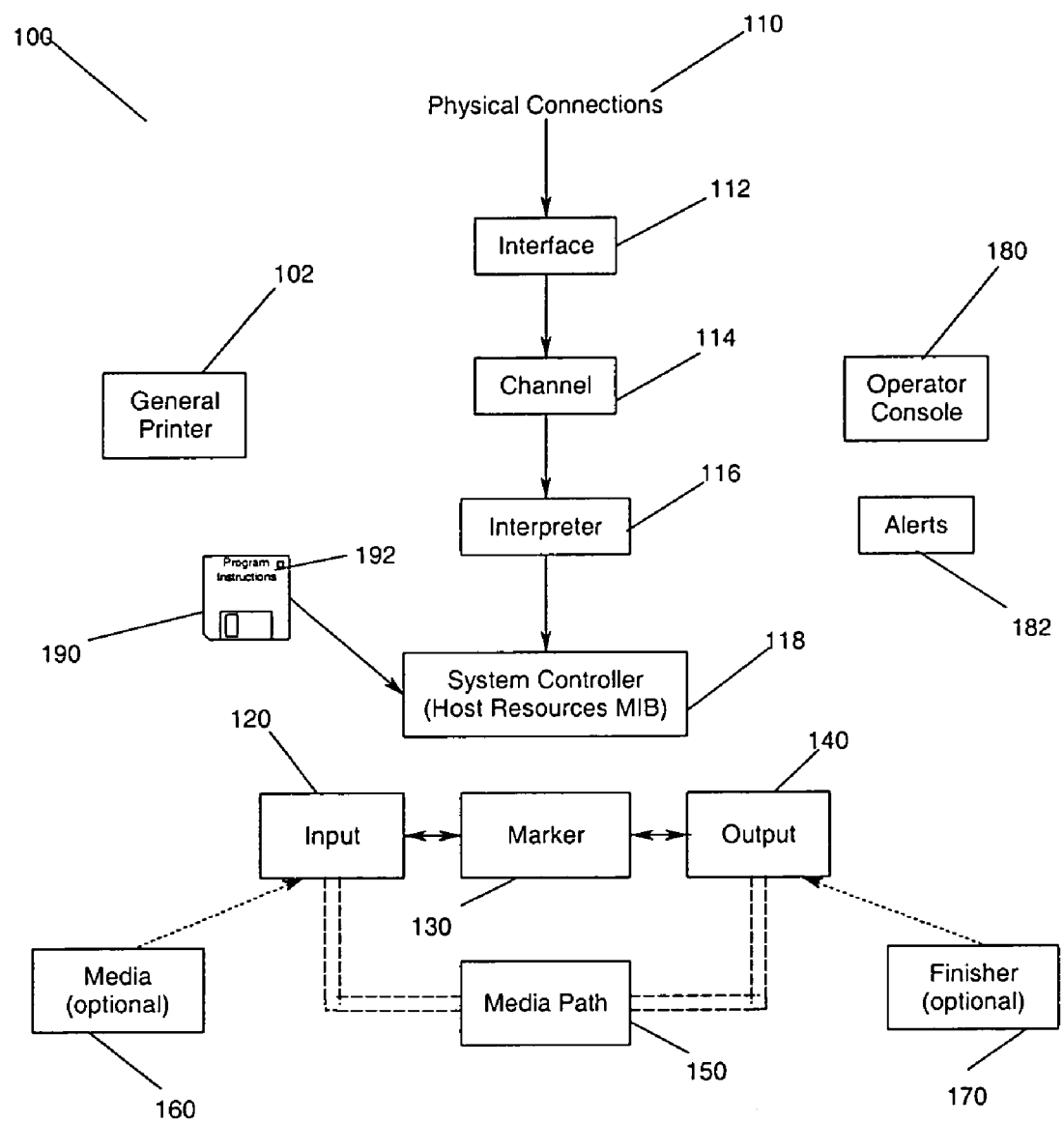
FIG. 1 illustrates a block diagram of a printer according to the present invention.

FIG. 1 illustrates a block diagram of a printer 100 according to the present invention. Those skilled in the art will recognize that the sub-units of the printer illustrated in FIG. 1 may not necessarily relate directly to any physically identifiable mechanism. Sub-units can also be a set of definable logical processes, such as interpreters for page description languages or command processors that set various operating modes of the printer.

FIG. 1 illustrates the three basic functions of the printer: (1) the flow of a print file into an interpreter and onto the marker, (2) the flow of media through the marker and (3) the auxiliary sub-units that control and facilitate the two flows. As shown in FIG. 1, the flow of the print data comes through a physical connection 110 on which some form of transport protocol stack is running to a printer interface 112. The data provided by the transport protocol (interface) appears on a channel 114. The channel 114 provides the data stream to the input to an interpreter 116. The interpreter 116 is responsible for the conversion of a description of intended print instances into images that are to be marked on the media. A printer may have one or more interpreters.

As shown in FIG. 1, the media 160 initially resides in Input sub-units 120 from which the media 160 is selected and then transported via a Media Path 150 first to a Marker 130 and then onto an Output 140 with (optionally) some finishing operations 170 being performed. The Input 120 is a mechanism that feeds media to be marked on into the printer. There may be as many Inputs 120 as there are distinctly selectable input "addresses". The Media 160 is an extension of the Input 120 which represents that media that is in an Input 120. The Output 140 is a mechanism that receives media that has been marked on. A printer may contain one or more Output mechanisms 140. There are as many Outputs 140 as there are distinctly selectable output "addresses". A finisher 170 is a unit that performs some operations on the media other than marking. Some examples of finishing processes are stapling, punching, binding, inserting, or folding.

A Marker 130 is the mechanism that produces marks on the print media. A printer can contain one or more Markers 130. Some examples of multiple marker sub-units 130 are: a printer with separate markers for normal and magnetic ink or an image setter that can output to both a proofing device and final film. Each Marker 130 can have its own set of characteristics associated with it, such as marking technology and resolution. The media paths 150 encompass the mechanisms in the printer that move the media through the printer and connect all other media related units: Inputs 120, Outputs 140, Markers 130 and Finishers 170. A printer may contain one or more media paths 150. In general, the design of the media paths 150 determines the maximum speed of the printer as well as the maximum media size that the printer can handle. Media paths 150 are complex mechanisms and can contain many different identifiable sub-mechanisms such as media movement devices, media buffers, duplex units and interlocks. Not all of the various sub-mechanisms reside on every media path 150. For example, one media path may provide printing only on one surface of the media (a simplex path) and another media path may have a sub-mechanism that turns the media over and feeds it a second time through the marker sub-unit (a duplex path). The duplex path may even have a buffer sub-mechanism that multiple copies of the obverse side to be held before the reverse side of all the copies are marked.

The auxiliary sub-units, such as the General Printer 102, Operator Console 180 and Alerts 182, facilitate control of the printer, inquiry/control of the operator panel, reporting of alerts, and the adaptation of the printer to various natural languages and characters sets. The General Printer 102 is responsible for the overall control and status of the printer. The Operator Console 180 is used to display and modify the state of the printer. The console 180 can be as simple as a few indicators and switches or as complicated as full screen displays and keyboards. The Alert unit 182 is responsible for detecting reportable events, making an entry in the alert table and, if and only if the event is a critical event, initiating a trap.

All of the above described functions run on the System Controller 118 which represents the processor, memory and storage systems of the printer. The System Controller 118 implements the control functions for processing a print job. The System Controller 118 includes the MIB, which provides access to data elements of the printer, such as the processor(s), memory, disk storage, file system and other underlying sub-mechanisms of the printer. The System Controller 118 can range from simple single processor systems to multiprocessor systems. In addition, controllers can have a full range of resources such as hard disks. Those skilled in the art will recognize that a printer may have more than one processor and multiple other resources associated with it.

A process for examining data in the incoming job and processing the attributes of the job, configuration parameters in the printer and the state of the printer engine and spooler to determine how to process the incoming print jobs is performed by the System Controller 118. The process, as will be described below with reference to FIGS. 2–4, may be tangibly embodied in a computer-readable medium or carrier, e.g. one or more of the fixed and/or removable data storage devices 190, or other data storage or data communications devices. The computer program 192 of the storage device 190 may be loaded into System Controller 118 to configure the System Controller 118 for execution. The computer program 192 comprise instructions which, when read and executed by the System Controller 118 causes the System Controller 118 to perform the steps necessary to execute the steps or elements of the present invention.

Figure 2:
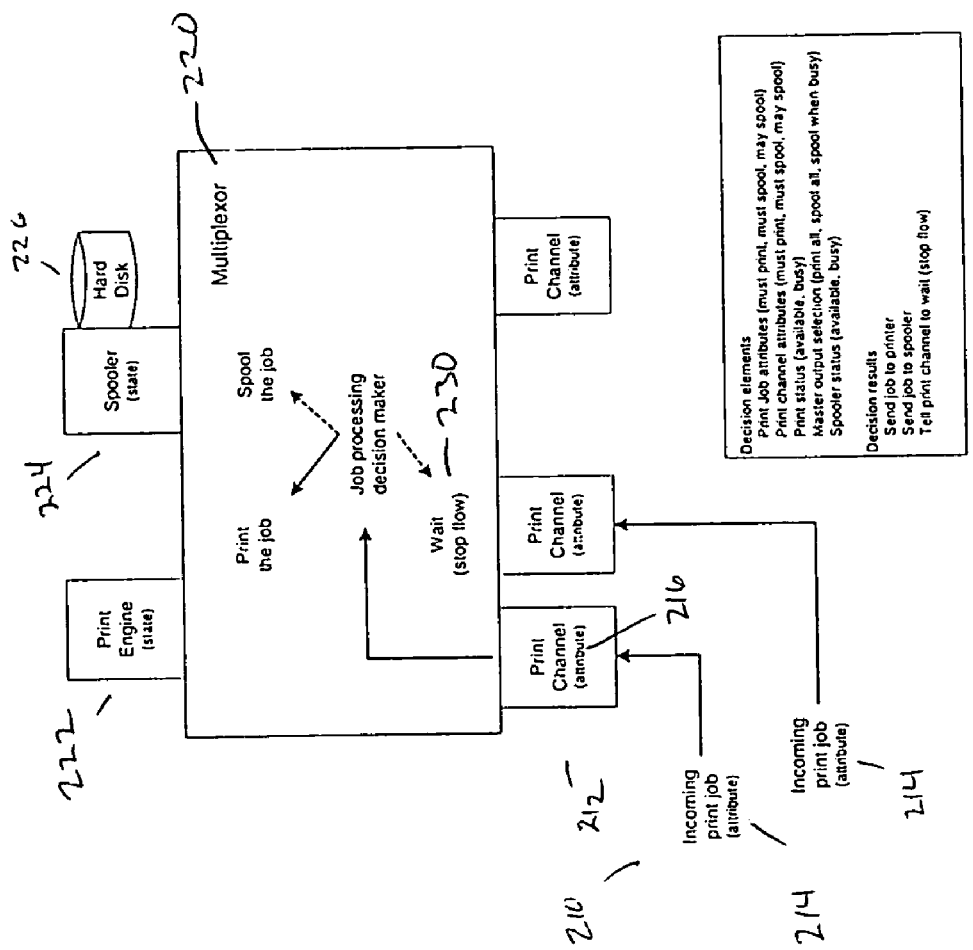
FIG. 2 illustrates a multiplexer system according to the present invention.

FIG. 2 illustrates a multiplexer system 200 according to the present invention. The multiplexer system 200 is a part of the system controller 118 of FIG. 1. FIG. 2 identifies the primary elements of the decision processes performed by the multiplexer system 200. Jobs 210 are received from client systems through print channels 212, such as the parallel port or TCP/IP LPD. A newly arriving job 210 is forwarded by the receiving print channel 212 to the multiplexer 220.

The multiplexer 220 determines the attributes of the incoming job 210 by examining attributes 214 in the first few bytes of the of the job 210. The attributes 214 indicate how the job 210 must be handled. The attributes include: MUST PRINT, MUST SPOOL and MAY SPOOL. An example of a MUST PRINT job is a microcode update file. An example of a MUST SPOOL job is an Adobe Portable Document Format (PDF) file. The MAY SPOOL attribute applies to jobs that are not identified as MUST PRINT or MUST SPOOL The multiplexer 220 also examines the attributes 216 associated with the print channel 212. These attributes 216 are also MUST PRINT, MUST SPOOL and MAY SPOOL. The attribute 216 for a print channel 212 is generally fixed by the type of the print channel 212. The attribute 216 for a print channel 212 that provides bi-directional communication with the interpreter or print engine 222 is marked MUST PRINT. Otherwise the print channel 212 is usually marked MAY SPOOL. However the print channel 212 may also be a configuration wherein the output of the print channel 212 must be directed to the spooler 224 and therefore set to MUST SPOOL.

If the attributes 214 of the print job 210 and the attributes 216 of the print channel 212 dictate an output path (either MUST PRINT or MUST SPOOL), then the multiplexer 220 examines the state of the selected path. If the designated output path (printer 222 or spooler 224) is busy, then the multiplexer 220 decision is to signal a Stop_Flow 230 to the print channel 212. The print channel 212 is signaled to Start_Flow at a later time, when the output path becomes available.

Figure 3:
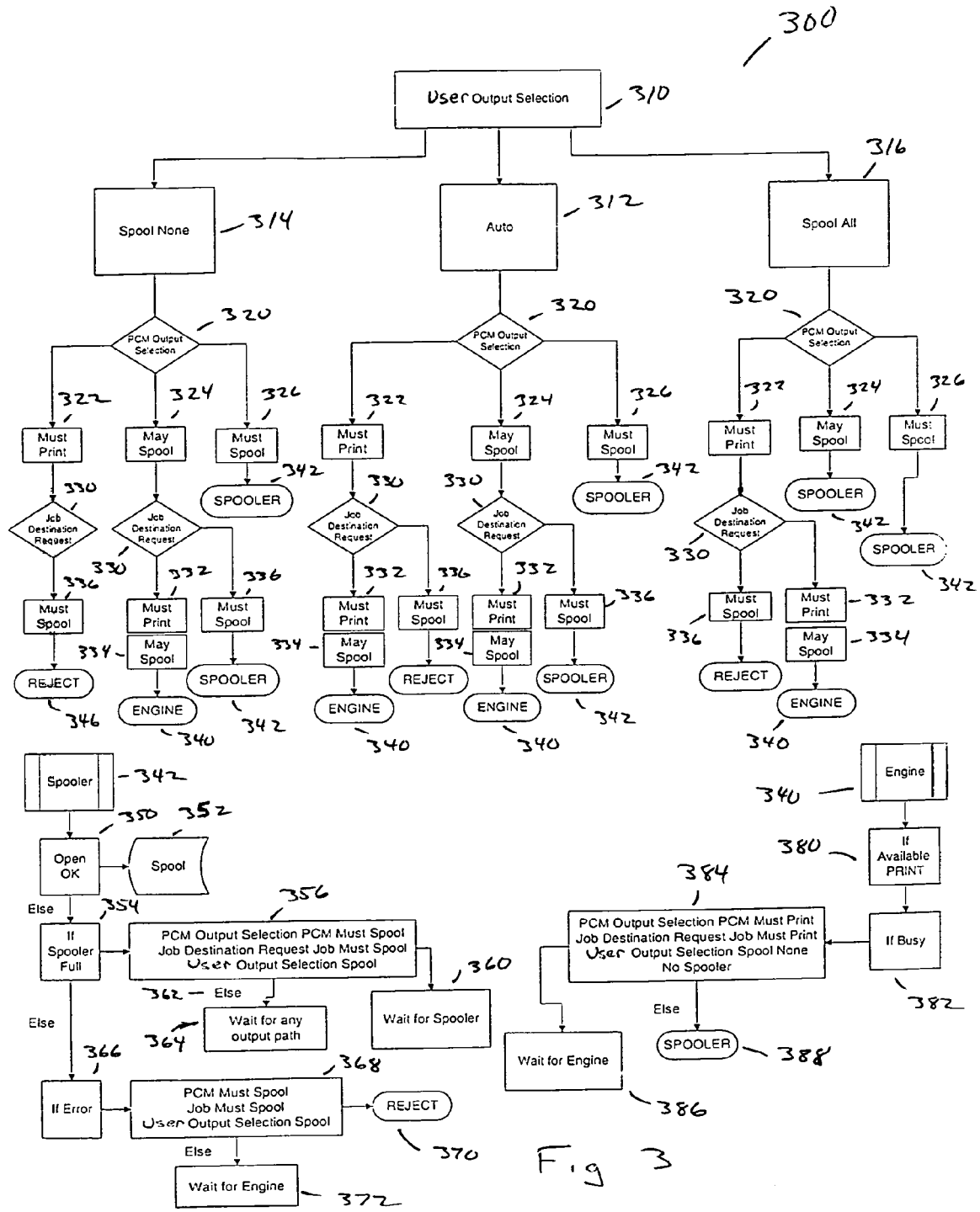
FIG. 3 is a flow chart illustrating the decision process performed by the multiplexer system according to the present invention.
Figure 4:
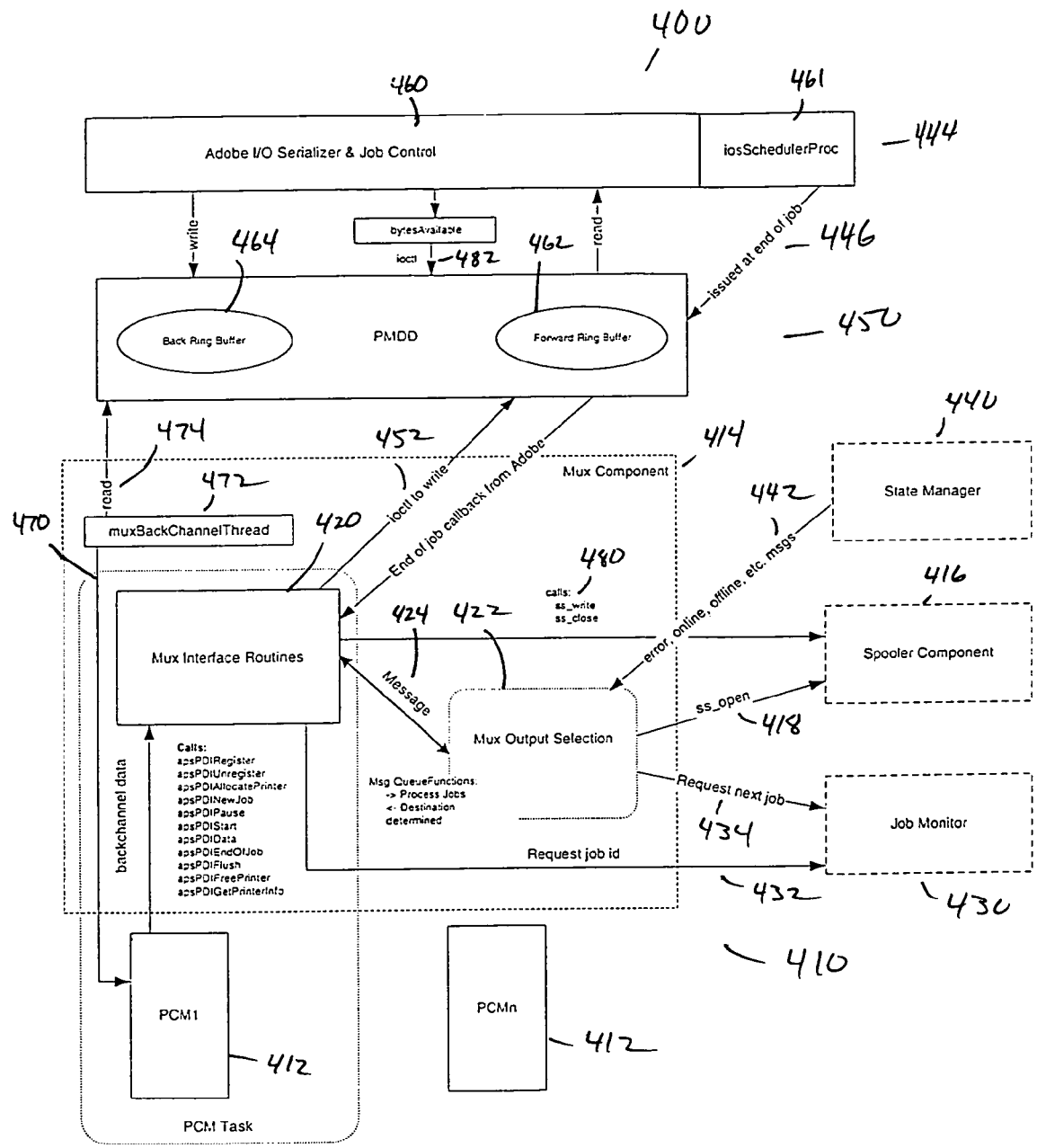
FIG. 4 illustrates one embodiment of a Data Channel multiplexer (multiplexer) and Printer Memory Device Driver (PMDD) components of a controller according to the present invention.

If the attributes 214 of the print job 210 and the attributes 216 of the print channel 212 do not dictate an output path, then the multiplexer 230 examines the User Output Selection setting (not shown in FIG. 2, see FIGS. 3–4). This value is set by an administrator. This setting allows the administrator to control spooling for jobs that are not required to be sent direct to the printer 222 or to the spooler 224. The values are: PRINT ALL, SPOOL ALL and SPOOL WHEN BUSY. PRINT ALL jobs are not required to be spooled due to the attributes 214 of the print job 210 or the attributes 216 of the print channel 212. SPOOL ALL jobs are not required to be printed due to the attributes 214 of the print job 210 or the attributes 216 of the print channel 212. SPOOL WHEN BUSY are jobs that are printed if the printer 222 is available or are spooled if the printer 222 is busy.

In the typical print environment many jobs are not subject to constraints and are therefore controlled by a User Output Selection setting. The PRINT ALL setting directs jobs 210 to the printer 222. If the printer 222 is busy with another job, then the new job is signaled to Stop_Flow 230, even though the job 210 might be able to be accepted onto the spooler 224. The SPOOL ALL setting directs jobs 210 to the spooler 224. If the spooler 224 is busy with other jobs, then the new job is signaled to Stop_Flow 230, even though the print engine 222 may be available. The SPOOL WHEN BUSY setting causes the multiplexer 220 to direct the job 210 to the print engine 222 if it is available. If the print engine 222 is busy, then the job 210 is directed to the spooler 224. If the spooler 224 is busy, then the print channel 212 is signaled to Stop_Flow 230. The print channel 212 is signaled to Start_Flow at a later time when either the printer 222 or the spooler 224 output path becomes available.

The mission of the multiplexer 220 is to manage logical connections between data channels 212 (which represent data sources) and the job control functions of the system controller and spooler output paths (which represent data sinks). The multiplexer 230 has several choices for the disposition of a new job 210. It may direct incoming print data to the printer 222 for immediate printing, or to the spooler 224. It may also signal the data channel to suspend the receipt of additional data until it can be processed. This is described in more detail in the following paragraphs.

The connection between a data source and data sink is managed such that no more than one data channel 212 has access to the printer 222 at a time. Spooling requires a spooler interface 224 and a hard disk drive 226. If the spooling feature is present, the multiplexer 220 manages the logical connection from data channels to the spooler 224. One or more spooling connections may be active at the same time. The maximum number of spooling connections that may be active at a time is a system configuration parameter.

In the simple case, when a print job 210 arrives at an idle printer, the multiplexer 220 connects the data channel 212 to Job Control. If other jobs arrive while the first job is being processed, the multiplexer 220 determines if the capabilities of the system and the characteristics of the new job are such that the new job can be spooled. If so, the multiplexer handles the connection of the data channel 212 to the spooler 224. If the spooler 224 is not present, or the job characteristics do not allow spooling, or the maximum number of concurrently spooling data channels has been reached, then the multiplexer 220 marks the device table for the data channel 212 making the request and signals the data channel to suspend the receipt of additional data by returning Stop_Flow 230. The multiplexer 220 is notified whenever an actively printing job finishes and whenever a spooling operation reaches the end of the job. When so notified, the multiplexer 220 checks for data channels that were previously signaled to suspend. If the requirements of a suspended data channel match the available output path, then the multiplexer 220 signals the data channel 212 to resume. When a data channel 212 is signaled to resume, the request for an output path is reissued, and this time it succeeds.

Data channels 212 are represented by Print Control Modules (PCMs). A PCM is an abstraction for a process that handles the receipt of print data from a network connection. In this model of printing, the PCM has a well defined interface to the layer above the PCM, called the Multiple-PCM (MPCM). In the present invention, the MPCM layer is replaced by the multiplexer 220. The PCM 212 to MPCM interface is the same as the PCM 212 to multiplexer 220. Therefore, all PCM implementations will work with the multiplexer 220 without modification. The controller may also include other data channels 212, such as Coax, Twinax, Parallel Port, the Despooler, internal print, and others. These components use the PCM defined interface to the multiplexer 220. As will be described below with reference to FIG. 4, an Output Selection (OS) thread is provided for making decisions that connect a data channel 212 to an output path, i.e., an output selection decision.

FIG. 3 is a flow chart illustrating the decision process 300 performed by the multiplexer system according to the present invention. As described above with reference to FIGS. 1–2, the system controller manages all printer processes. It manages the receipt of data through various attachments, the spooling and despooling of print jobs if the spooler feature is installed, the rendering of a print image from received print data, and the electrophotographic printing process. The multiplexer is the decision making component that determines how and when incoming print data is processed.

The decision process 300 is governed by a number of attributes. In FIG. 3, the primary attributes that will be discussed are the User Output Selection attributes 310, the PCM Output Request attribute 320, the Job Destination Request attribute 330 and the Job Output Assignment attributes. The User Output Selection attributes 310 include AUTO 312 (SPOOL WHEN BUSY), PRINT ALL 314, and SPOOL ALL 316. The PCM Output Request attributes 320 include MUST PRINT 322, MAY SPOOL 324, and MUST SPOOL 326. The Job Destination Request attributes 330 include MUST PRINT 332, MAY SPOOL 334, and MUST SPOOL 326. Finally, the Job Output Assignment attributes includes Printer (Engine) 340, Spooler 342, Stop_Flow 344, and Cancel 346.

In FIG. 3, the first selection involves the user control attribute 310. The user control attribute 310 determines how the multiplexor (multiplexer) output selection thread is to handle an incoming job. The user control attribute 310 is persistent, i.e., kept in the configuration manager, and it is fetched from configuration manager whenever it is examined. Thus, no reboot is required to effect a value change.

This attribute 310 is only valid if the following three conditions are met. The spooler must be installed in the system, the spooler must be enabled to accept new jobs and the despooler must be enabled to print spooled jobs. The User Output Selection attribute 310 is examined by the multiplexer Output Selection (OS) thread only if this set of conditions is true. If these conditions are not true, then the User Output Selection 310 bit is not examined, and the only output path available for incoming jobs is the printer. In this case, any received job that must be spooled is "rejected", i.e., data is received and discarded.

The job rejection process 346 within the multiplexor is similar to the processing of any other job: the multiplexer OS thread sends a response message to the PCM that requested the selection of an output path. The response indicates "REJECT" the job, as opposed to the other multiplexer OS thread responses which are: "PRINT" the job, "SPOOL" the job, or "Stop_Flow". When a job is rejected, a "Cancel Job" or REJECT 346 attribute is set in the Job Output Assignment attribute in the device table. The Job Output Assignment attribute is described later, and must not be confused with the Job Destination Request attribute 330 in the device table, which is also described later. When Cancel Job is set, all data for the job is received and discarded. The "Cancel Job" attribute is reset at the end of the job.

As shown in FIG. 3, the User Output Selection attribute 310 has the following values: AUTO 312 (SPOOL WHEN BUSY), SPOOL ALL 316, and SPOOL NONE 314 (PRINT ALL). This attribute is set by the user and may be set, for example, through a web page, SNMP, or the console.

The AUTO value 312 for the User Output Selection attribute 310 indicates that the printer, specifically the multiplexer OS thread, will automatically determine how to handle a new job, based on internal settings, e.g., PCM and Job attributes, as will be described later. The SPOOL ALL value 316 for the User Output Selection attribute 310 indicates that all jobs are to be spooled wherever possible. This causes the multiplexer OS thread to direct incoming jobs to the spool unless the job must be printed, e.g., IPDS. The MUST PRINT 332 status is determined by the multiplexer OS thread by examining the state of the PCM Output Request attribute 320 (described later). The SPOOL NONE value 314 for the User Output Selection attribute 310 indicates that all jobs are to be printed wherever possible. This causes the multiplexer OS thread to direct incoming jobs to the printer unless the job must be spooled, e.g., PDF. The MUST SPOOL status 336 is determined by the multiplexer OS thread by examining the state of the PCM Output Request attribute 320 (also described below).

Next, the PCM Output Request attribute 320 is evaluated. This attribute 320 indicates how the multiplexer OS thread treats a new job. It is examined in conjunction with the User Output Selection attribute 310. The attribute 320 is persistent, i.e., kept in configuration manager, and fetched when needed. Thus, no reboot is required to effect a value change. In the preferred embodiment, the value of this attribute for each PCM is static for all PCMs. However, those skilled in the art will recognize that there is no requirement for the value to be static. For example, the attributes of a PCM may be dynamic such that the data channel determines the attribute and sets the PCM accordingly. Thus, dynamic merely means reading the value from the configuration manager when it is needed. This allows for flexibility with no code changes. The PCM Output Request attribute 320 values are: MUST PRINT 322, MAY SPOOL 324, MUST SPOOL 326 and the value of the PCM Output Request attribute 320 for each PCM is:

| | |
|---|---|
| Web Pull | MAY SPOOL |
| Web Push | MAY SPOOL |
| IPP | MAY SPOOL |
| FTP | MAY SPOOL |
| Port 9100 | MAY SPOOL |
| Port 5001 | MUST PRINT |
| Port 2501 | MAY SPOOL |
| LPD | MAY SPOOL |
| NetBIOS | MAY SPOOL |
| AppleTalk | MUST PRINT |
| NetWare | MAY SPOOL |
| Coax | MUST PRINT |
| Twinax | MUST PRINT |
| Parallel | MAY SPOOL |
| Despooler | MUST PRINT |
| Internal Print | MUST PRINT |

Port 5001 supports only the IPDS data stream. Processing the IPDS data stream requires an interactive bi-directional session between the host and the IPDS interpreter in the printer. This configuration requires a MUST PRINT 322 setting for the PCM Output Request attribute 320. Appletalk from a Macintosh typically sends queries to the printer using the PostScript PDL in the beginning of the print job submission process. Like IPDS, this interactive process requires a live bi-directional session with the interpreter. For the same reasons it requires a MUST PRINT 322 setting for the PCM Output Request attribute 320. Port 9100 and Port 2501 merely represent ports for raw protocol, i.e., a direct print port.

Output from the Despooler must be printed. Internal Print is, by definition, "high priority" output. While it may be possible, from an architectural standpoint, to spool this output, it is not desirable from a printer design standpoint. In the preferred embodiment, no PCM has a MUST SPOOL setting 326. However, the design supports MUST SPOOL 326. Namely, if a PCM Output Request attribute were 320 set to MUST SPOOL 326, the system would work as described herein.

Next, the Job Destination Request attribute 330 is examined. This attribute 330 reflects the requirements for the job, if there are no overriding considerations presented by the User Output Selection 310 and PCM Output Request 320 attributes. This attribute is examined by the multiplexer OS thread in conjunction with the User Output Selection 310 and PCM Output Request 320 attributes described above. The attribute is not persistent. It is kept in the device table for each PCM. The value is changed for each job. The values for the Job Output Request attribute are almost the same as for the PCM Output Request attribute: UNINITIALIZED, MUST PRINT 332, MAY SPOOL 334, MUST SPOOL 336.

The Job Destination Request attribute is set to Uninitialized by the multiplexer component at initialization and also at the end of each job. The attribute may be set by a PCM call to set the multiplexer destination attribute after the call to begin a new job and before the first call to a routine for handling the data for the print job. If the attribute value is Uninitialized at the time of the first call to the routine for handling the data for the print job, then the data stream is examined for a MUST SPOOL job, e.g., a PDF file, and sets the bit accordingly. If a MUST SPOOL file is found, then the attribute is set to MUST SPOOL 336. The multiplexer OS thread examines the Job Destination Request attribute 330 if, and only if, the output disposition for the job is not conclusive after examining the User Output Selection 310 and PCM Output Request 320 attributes. Namely, the User Output Selection attribute 310 is set to AUTO 312 and the PCM Output Request attribute 320 is set to MAY SPOOL 324. In this case, the value of the Job Output Request attribute 330 determines how the job is processed. If the User 310 and PCM 320 attributes provide a conclusive determination, then this attribute is not examined by the multiplexer OS Thread.

The following describes the values of the Job Destination Request attribute and when they are used. Uninitialized is a value that is set by a cleanup routine at the end of a job, and it is also initialized at initialization. The multiplexor scans for a MUST PRINT 332 job. If this type of job is submitted, e.g., microcode update, the value of the attribute 330 is set to "MUST PRINT" 332. MUST SPOOL 336 is a value that is set by the routine for handling the data for a print job if the data stream is scanned and found to be a MUST SPOOL job, e.g., a PDF file.

The Job Destination attribute is an attribute that is reset by the multiplexer cleanup routine when the interpreter has gone down. It is set by the multiplexer OS thread. The Job Destination attribute reflects the output assignment that was made by the multiplexer OS thread for the current job. The attribute is not persistent. It is kept in the device table for each PCM and the value is changed for each job. The attribute is used by the routine for handling the data for a print job to determine how to process the block of associated data. The following describes the values of the Job Output Assignment attribute and how they are used.

Uninitialized is a value that is set by the routine for initializing a new job to indicate that no job output assignment has been made. The routine for handling the data for a print job examines the attribute. If it is Uninitialized, then a message is sent to the multiplexer OS thread to find a path for the new job. The attribute is set by the routine for handling the data for a print job based on the response message from the multiplexer OS thread. If the value is not Uninitialized when it is examined by the routine for handling the data for a print job, then the value reflects the output path that was assigned by the OS Thread.

Reject Spooler 346 is a value that is set when a job requires a spooler and none is present.

Printer 340 is a value that is set when the response message from the multiplexer OS thread indicates that the job is assigned to the printer. In this case, the routine for handling the data for a print job issues an IOCtl call to the Printer Memory Device Driver (PMDD) for the current block of data.

Spooler 342 is a value that is set when the response message from the multiplexer OS thread indicates that the job is assigned to the spooler. In this case, the routine for handling the data for a print job issues an ss_write call to the spooler for the current block of data.

None Available 344 is a value that is set when the response message from the multiplexer OS thread indicates Stop_Flow. This occurs when the printer or spooler is too busy to handle the job. In this case, the routine for handling the data for a print job returns Stop_Flow to the caller.

Cancel is a value (not shown) that is set when the response message from the multiplexer OS thread indicates a cancelled job. This occurs when the job is cancelled by the user through, for example, the operation panel or through a web page. In this case, the routine for handling the data for a print job does not process the data. Nothing is done with the data when the call for the routine for handling the data for a print job is received.

Based upon the Job Destination Request attribute 330, the print job is rejected 346, sent to the print engine 340 or sent to the spooler 342. When the job is sent to the spooler, if the spooler is open 350, the job is spooled 352. Otherwise, a determination is made whether the spooler is full 354. If the spooler is full, the attributes are examined 356. If the PCM Output Selection PCM attribute is set as MUST SPOOL, the Job Destination Request attribute is set to MUST SPOOL and the User Output Selection attribute is set to Spool, the job waits for the spooler 360. Otherwise 362, the job waits for any output path 364. If the spooler is not full, an error condition is occurring 366. Again, attributes are analyzed 368. If the PCM is MUST SPOOL, the Job attribute is MUST SPOOL and the User Output Selection is set to Spool, then the job is rejected 370. Otherwise, the job waits for the print engine 372.

When the job is sent to the printer 340, if the printer is available, the job is printed 380. Otherwise, a determination is made that the printer is busy 382. The attributes are examined 384. If the PCM Output Selection attribute is set as MUST PRINT, the Job Destination Request attribute is set to MUST PRINT and the User Output Selection attribute is set to SPOOL NONE, the job waits for the engine 386. Otherwise, the job is sent to the spooler 388.

The output selection decision process of the multiplexer OS thread that is described above is summarized by the following diagram. There are 2 major categories: Spooler Present and No Spooler Present. Spooler Present means that the spooler is installed in the system, that the spooler is enabled to accept incoming jobs, and that the despooler is active. No Spooler Present is the absence of this condition. In either case, the decision process is expressed as a series of checks that are made by the OS Thread.

The first check involves checking the state of the PCM Output Request attribute. The table below shows the state of the PCM Output Request attribute and

TABLE 1

| PCM OUTPUT REQUEST ATTRIBUTE | ACTION |
|---|---|
| MUST PRINT | Preliminary assignment to Printer; Continue to Check #3 |
| MAY SPOOL | Proceed to Check #2 |
| MUST SPOOL | Reject Job, skip checks #2 and #3 |

The second check looks at the state of the Job Output Request attribute. The table below shows the action resulting from the state of the Job Output Request attribute.

TABLE 2

| JOB OUTPUT REQUEST ATTRIBUTE | ACTION |
|---|---|
| MUST PRINT | Preliminary assignment to Printer, continue to Check #3 |
| MAY SPOOL | Preliminary assignment to Printer; continue to Check #3 |
| MUST SPOOL | Reject Job, skip check #3 |

The third check involves looking at the state of the Printer output path. If the Printer output path is free, then it is marked as busy and a response message of "Job Assigned to Printer" is sent. Otherwise, the requesting PCM continues to wait for an output path and a response message of "Stop_Flow" is sent.

FIG. 4 illustrates one embodiment of a Data Channel multiplexer (multiplexer) and Printer Memory Device Driver (PMDD) 450 components of a controller 400 according to the present invention. Jobs are received from client systems through print channels, represented in FIG. 4 as PCM 412. A newly arriving job is forwarded by the receiving print channel to the multiplexer 414. A job is scanned by the multiplexer 414. If the job is determined to be a MUST SPOOL file, e.g., a PDF file, the Job attribute is marked as "MUST SPOOL". If the scanned job is identified as MUST PRINT file, then it is marked as "MUST PRINT". If neither MUST SPOOL of MUST PRINT, then the file is a candidate for direct printing or for spooling—whichever comes first.

The multiplexer 414 provides output paths for a job. The output paths includes the path to the printer (not shown), and 0 or more paths to the spooler 416. The multiplexer OS 422 maintains an internal variable that indicates the availability of the printer. If the printer is not available, then the job must be spooled, suspended, or rejected, depending on other conditions. The multiplexer OS 422 maintains an internal variable that indicates the availability of the spooling feature. Availability of the spooling feature is determined by the multiplexer OS 422 when it attempts to do an sp_open 418 for a new job. The multiplexer 414 does not maintain an internal indication of the state of the spooling system. If the decision by the multiplexer OS thread is to spool the job, then the multiplexer OS 422 makes a ss_open call 418 to the spooler 416. This call requests a handle from the spooler 416 that will be used with subsequent calls to write data to disk.

The spooler 416 responds with either denial, or a handle. If the request is denied and the error indicates that the maximum number of concurrent spooling operations has been reached, then the multiplexer OS 422 signals the PCM 412 to suspend the receipt of data. If the open succeeds, then the multiplexer OS 422 returns the handle to the PCM 412 with an indication that the job is allocated to the spool. This causes the PCM to write the data to the file system, using the handle returned by the multiplexer OS 422, and to continue receiving data and write it to the spool.

The multiplexer processor component 414 manages new jobs as they arrive. As mentioned above, certain types of jobs, for example PDF files, must be spooled and converted to PostScript before printing. Other types of jobs, for example IPDS, must be sent directly to the printer (cannot be spooled) because the host system maintains a interactive session with the IPDS interpreter during job processing. In some, but not all cases, the information required to select an output path is available at the time that the PCM 412 calls the multiplexer new job routine via the multiplexer interface 420. However, in all cases the required information to make the decision is available at the time that the first block of data for a new job is presented to the multiplexer interface 420 by the data handling routine. Consequently, the data handling routine calls the multiplexer OS 422 to make the decision at the time it receives the first block of data from the PCM 412 rather than the call for the new job.

When the data handling routine is called with a first block of data for a new job, data handling routine sends a message 424 to the multiplexer OS 422 requesting an output path for the new job. The data handling routine waits for a response message from the multiplexer OS 422. The wait should be very short. The message 424 from the multiplexer OS 422 indicates the result of the selection. The data handling routine returns control to the PCM 412 with the result. The result is successful (an output path was selected, job transmission can continue), Stop_Flow (acceptable output paths exist, but none are available at the moment) or Reject (an acceptable output path does not exist and the job cannot be processed), e.g., PDF file, no spooler in the system. In the Reject case, the data handling routine marks the device such that all subsequent data received for the job is discarded by the multiplexer.

A special variable can be sued to cause the data handling routine to return control without signaling the OS thread or processing the data. This setting may be used for testing. It allows the logic of a PCM to be executed without producing any output. The setting can be used for most Postscript and PCL data streams. It is not usable with an IPDS data stream, or in connection with a host system that depends on back-channel data. The PCM settings are accessible through selections by the user, e.g., on the Support web page.

Next, the processing that is performed when the end of a job is reached for a job that is being sent to the printer or to the spooler will be described. When the current job completes (printer or spooler), the multiplexer OS 422 is notified and will call the Job Monitor 430 to get the job ID of the next job 432 that should print or be spooled, depending on the output path that has just become available. The signaling is handled differently for the printer and spooler paths. For the spooler path, the multiplexer end-of-job routine from the state manager 440 sends the message 442 to the multiplexer OS 422. The multiplexer OS 422 calls the Job Monitor 430. If a job ID is returned, the multiplexer OS 422 will do a "Start_Flow" to the corresponding PCM 412. When the interpreter shuts down, the Adobe code 444, according to the embodiment described herein, calls 446 into the PMDD 450. The PMDD 450 then issues a callback 448 into the multiplexer 414.

This callback is registered with the PMDD 450 when a beginJob IOCtl 452 is called at the beginning of a job going to the printer. An IO Serializer Scheduler 460 callback (muxIOSScheduler) 461 calls the PMDD 450 to shut down the forward 462 and backward 464 ring buffers and sends a message 424 to the multiplexer OS 422 to look for a new job for the printer. The call to the PMDD 450 from the Adobe IO Serializer code 460 signals the end of job for the printer path rather than the multiplexer end of job routine. This is because the print job may still be in progress at the time that the multiplexer end of job routine is called. The call to the multiplexer end of job routine signals the passage of the end of the job through the multiplexer, but there may be a significant amount of print data in the ring buffer yet to be processed. The processing of this data can generate back-channel data 470 that must pass through the multiplexer 414. The multiplexer 414 cannot select a new job for printing until the interpreter for the current job completes processing.

When a job ID is received from the Job Monitor 430, the multiplexer OS 422 finds the appropriate PCM 412 that corresponds with the job ID. When a PCM 412 is selected, the multiplexer OS 422 updates the device table for the newly selected PCM 412 with information that the multiplexer routines require in order to process subsequent PCM requests. The multiplexer OS 422 calls the status call-back routine for the selected PCM 412 with a Start_Flow indication. The Start_Flow will cause the PCM 412 to wake up and reissue the call to the data handling routine (the prior call resulted in a Stop_Flow). The decision process is executed again. The Start_Flow job is presented to the multiplexer OS 422 as a completely new job.

After an output path is assigned by the multiplexer OS 422, the data handling routine makes calls to routines of the output path processor when the PCM 412 has a buffer of data. If the output path is the printer, then a call is made to the PMDD 450 for each buffer of print data. If the output path is the spooler, then ss_write calls 480 are made to the spooler 416.

The architecture of the multiplexer 410 and PMDD 450 components support the bi-directional transfer of data between the host system and the interpreter (through the PCM). The reverse flow of data from the interpreter to the host is sometimes referred to as the "back-channel" 470. Back-channel data is processed asynchronously to forward channel data. A multiplexer thread, called the back-channel thread 472, processes back-channel traffic. The thread provides timely processing of back-channel data without encumbering or unduly complicating the forward delivery of print data to the output path. There are no inherent limitations to the volume of back-channel data that can be processed by the system. However, it is expected that the volume of back-channel traffic is relatively small in comparison to the volume of forward traffic.

The implementation of a back-channel 470 depends upon the network application layer protocol (e.g. LPD or raw TCP/IP ports), and back-channel support in the PCM. A PCM 412 can provide back-channel support only if the application layer protocol supports it. For example, the LPD protocol does not provide a mechanism for transporting back-channel data 470 that is generated by layers above LPD. Consequently, the LPD PCM does not support back-channel traffic.

Prior systems do not provide a way for the layer above the PCM to determine if the PCM supports backchannel traffic 470. In prior systems, any backchannel traffic is provided to the PCM 412 and each PCM 412 processes it according to the design of the PCM 412, either ignoring it, or sending it back to the host system. A system controller according to the present invention extends this functionality. A bit in the PCM device table identifies whether the PCM 412 supports backchannel data or not. Depending upon the PCM 412, this bit is either hard coded (compiled in), or it is manipulated by the PCM 412 on a job by job basis. When the multiplexer OS 422 has a new job to send to the printer, an IOCtl call 452 is made to the PMDD 450 to inform the PMDD 450 that a new job is beginning. This call identifies whether the new job supports backchannel traffic 470 or not. If it is supported, then the PMDD 450 processes subsequent backchannel Write requests normally, putting the data into the backchannel ring buffer 464. If it is not supported, then the PMDD 450 treats backchannel Write requests as a nop (no operation).

The backchannel thread 472 obtains a block of data to be transmitted to the host system by making a blocking call 474 into the PMDD 450. The call 474 blocks execution until a block of data is available. Backchannel data 470 is provided to a PCM 412 by setting pointer and length fields for the backchannel data 470 and calling the a routine for the PCM 412 indicating status of the backchannel. The PCM 412 copies the data from the specified location and returns control to the caller.

The backchannel thread 472 is started at multiplexer initialization time and remains active forever. The design of the interfaces to get backchannel data 470 from the PMDD 450 and provide it to the PCM 412 are such that a separate buffer is required by the backchannel read routine. The local backchannel read buffer is allocated at initialization time. The call to the PMDD 450 copies the data from the ring buffer to the local buffer. Pointer and length values for data in the local buffer are then set in the PCM 412 and the PCM status routine is called. The PCM 412 moves the data from the local buffer to a PCM transmit buffer before returning control.

Next, the interface to the spooler 416 will be described. At system initialization time the multiplexer OS 422 determines if the spooling feature is installed in the printer. If the spooling feature is installed, then the multiplexer OS 422 issues an sp_open 418 to the spooler 416 when it attempts to allocate a spooling output path for a job. If the sp_open 418 succeeds, then the multiplexer OS 422 returns the file handle to the requesting data handling routine.

For spooled jobs, the multiplexer OS 422 generates a list of job attributes that are passed to the spooler 416. The job attributes are used to manage jobs while they are in the spool, and by the despooler when the job is re-processed for printing. The attributes associated with a job are derived from different variables, depending upon the PCM 412.

Job boundary synchronization is the process of synchronizing the threads within the printer that deal with the forward and backward flow of data such that, from the perspective of the multiplexer 410, the old job is complete before a new job is started. The recognition of a job boundary by the multiplexer processor component 414 is not necessarily concurrent with the recognition of a job boundary by other components. In most cases, the multiplexer 410 will recognize a job boundary before all pages for the job are printed.

Backchannel data 470 is processed by the multiplexer backchannel read routine 474. This routine 474 calls the PMDD 450 to read data from the backchannel ring buffer 462, 464 into a local buffer. It then calls a PCM routine to send the data back to the host system. There are multiple PCMs 412 in the printer. The PCM 412 that is called by the backchannel read routine is set by the multiplexer Output Selection 422 at the time that a new job is started. In order to avoid backchannel data 470 being sent to the wrong PCM 412, the multiplexer Output Selection 422 cannot set the PCM 412 for the new job until all backchannel activity for the old job is complete. The required job boundary synchronization is achieved by an IOCtl call 482 to the PMDD 450.

In the Adobe model, the IO Serializer Scheduler routine 460 is called when the current job is complete. The mission of this routine is to select and start the next job. In the system controller of the present invention, this routine first synchronizes with the backchannel, through the aforementioned IOCtl call 482 to the PMDD 450, and then signals the multiplexer Output Selection 422 to select and start the next job 434. Within the context of the present invention, the system is defined to be at the end of the current job when the IO Serializer Scheduler 460 executes the synchronization IOCtl call 482 to the PMDD 450.

Under normal conditions, i.e., a normal end-of-job rather than an end-of-job due to a timeout, when the end of job is reached no additional backchannel data is accepted into the backchannel ring buffer, and any existing backchannel data in the buffer is processed (sent to the host system) before the next job is started using an IOCtl call signaling a backchannel normal end-of-job. On the other hand, if the current job ends due to a timeout, then any existing backchannel data in the ring buffer is purged using an IOCtl signaling a backchannel timeout end-of-job.

The printer will generate a signal 446 that a job has completed. The PMDD 450 is called 446 at the end of a job by the Adobe code 444. The multiplexer 410 registers an address of a callback function with the PMDD 450 at the time a begin job command is sent to the PMDD 450. When the PMDD 450 gets called by the Adobe code 444, it will in turn call the callback and return to Adobe the data channel returned by the multiplexer callback. The multiplexer 410 will check to make sure that this is a true end of job condition and then send a message to the multiplexer OS 422 to find a new job to send to the printer.

The multiplexer 410 interfaces with several components. The main purpose for the PCM interface 412 to the multiplexer 414 is to communicate the initiation of a new job, job data, and end of job to the multiplexer 414. The PCMs 412 interfaces with the multiplexer 414 through the following routines:

ApsPDIRegister
    ApsPDIUnregister
    ApsPDIAllocatePrinter
    ApsPDINewJob
    ApsPDIPause
    ApsPDIStart
    ApsPDIData
    ApsPDIEndOfJob
    ApsPDIFlush
    ApsPDIFreePrinter
    ApsPDIGetPrinterInfo
    PCMStatusReport—call back into PCM from MUX component The multiplexer 414 also communicates with the spooler 416 and PMDD 450 component to supply data. The multiplexer 414 main routines run on behalf of the calling PCM's thread. The output selection task is automatically spawned at system initialization time as part of System Services. The backchannel thread 472 is spawned by the MuxInitialize routine.

The muxInitialize( ) routine is invoked by the multiplexer OS 422 and spawns the backchannel thread 472 and initializes device tables. The apsPDIRegister(aspsPrintHandle **pstPrintHandle, PDISCB fnStatusReport) routine is a direct call from PCM 412 to multiplexer 414. The apsPDIRegister( ) routine allocates aspsPrintHandle structure and acts to initialize. The callback routine is stored in aspsPrintHandle.

The apsPDIUnregister(aspsPrintHandle *hPrinter) clears out the device table entry. There is one device table entry per PCM 412. In addition, a check is performed to determine if an active job exists for this PCM 412 and a check is made to ensure that the PCM ID from the device table matches the PCM ID in aspsPrintHandle structure.

The apsPDIAllocatePrinter(aspsPrintHandle *pstPrintHandle) routine is a routine for returning a successful indication to the calling PCM 412. A value is set in the device table stating that an allocate has been done. A value is set in the device table and aspsPrintHandle that flowstate is "Start_Flow" and a message indicating success is returned.

The apsPDINewJob( ) routine makes a new job request 434. The routine ensures that the PCM 412 is registered. If this PCM 412 is in pause mode, then apsPDIStart is invoked to indicate the forcing through of a new job. Also, the necessary variables in device table are modified to indicate that a job is about to start.

The apsPDIData(aspsPrintHandle *pstPrintHandle, int8 *pbDataToPrint, int32 uIDataLength) routine is the data handling routine for the print job. A Stop_Flow is returned for the first call if no output path is available. If this is the first block of data for the job and no job ID exists yet, a job ID is obtained 432 from the Job Monitor 430. If the PCM 412 has not specified an output path requirement, a determination is made to check if this is a MUST SPOOL file, e.g., a PDF file. If it is, the destination requirement is set to go to the spooler 416. Also, a determination is made to check if this is a microcode update file. A message is sent to the multiplexer OS 422 and the job waits for a response to see if an output path is available. If no output path is available, the return code is set to "Stop_Flow" and returned to the PCM 412. If an output path is available, the personality (interpreter) to use is set. The begin Job IOCtl 452 is issued to the PMDD 450. This call also enables the appropriate channels (forward and/or backward channels). If an output path is available the process continues.

If the destination is to the printer, the IOCtl 452 is issued to the PMDD 450. If the data was not able to be written to the ring buffer 462, 464, a "Stop_Flow" is returned to the PCM 412. If the destination is to the spooler 416, the appropriate call is issued to write the block of data to the spooler 416. If the destination is to the special variable setting, or this job has been cancelled, no action is taken. A value indicating acceptance of the job is returned.

The apsPDIEndOfJob( ) routine sets a flag that end of job has been called. If the destination is the printer, call PMDD to put EOF. If destination for this job is the spooler 416, do an ss_close 480. This sends a message to multiplexer OS 422 that the spooler 416 is finished with its job and a new job can be sent to the spooler 416. An MCU_Close is issued if the job is a microcode update.

The apsPDIFlush( ) routine invokes an IOCtl 452 to the PMDD 450 to flush any data out of the forward ring buffer 462, 464. The apsPDIFreePrinter( ) routine sets values in the device table to indicate that no job is currently processing.

The apsPDIGetPrinterInfo( ) routine is run to obtain the printer status. The data is obtained. The apsPDIGetJobID( ) routine is ran to obtain a job ID.

The muxCancelJob( ) routine sets the appropriate variables for ending a job. The IOCtl call 452 is sent to the PMDD 450 to flush out the forward channel and to put an EOF indication in the forward channel. The MuxBackChannelThread handles backchannel data 470. The routine issues a blocking read to the PMDD 450 and sends data back to the PCM 412 when data is received.

The multiplexer OS 422 waits on its message queue for one of several messages: If a message is received from apsPDIData when the first block of data for a job arrives, the multiplexer OS 422 returns to apsPDIData an output destination (printer, spooler, and none available). If a message is received from muxIOSScheduler, the multiplexer OS 422 looks for a new job to send to the printer. This is accomplished through an interface to the Job Monitor 430.

If a message is received from apsPDIEndOfJob when the destination is the spooler 416, the multiplexer OS 422 looks for any waiting jobs to send to the spooler 416. This is also accomplished by an interface with the Job Monitor 430.

A message may be received from the spooler 416 if the spooler 416 was previously full and now has space available.

The multiplexer OS 422 also processes job cancel which is received by a callback from the Job Monitor 430. The multiplexer OS 422 makes sure that the job ID that is being cancelled is the one currently being processed by the multiplexer. If it is, then the multiplexer OS 422 returns a cancel state to the active PCM 412 if it is registered to handle a cancel situation. A FwdTimeout IOCtl 452 is issued to the PMDD 450 along with a PutEOF to signal an end of job, and PDLCancel to notify the PDL that the job has been cancelled.

In summary, the present invention provides a method and apparatus for examining data in the incoming job and processing the attributes of the job, configuration parameters in the printer and the state of the printer engine and spooler to determine how to process the incoming print jobs. A multiplexer system is provided for analyzing jobs received from client systems through print channels. The multiplexer determines the attributes of the incoming job. The multiplexer also examines the attributes associated with the print channel. If the attributes of the print job and the attributes of the print channel dictate an output path (either MUST PRINT or MUST SPOOL), then the multiplexer examines the state of the selected path. If the designated output path (printer or spooler) is busy, then the multiplexer decision is to signal a Stop_Flow to the print channel. The print channel is signaled to Start_Flow at a later time, when the output path becomes available.

If the attributes of the print job and the attributes of the print channel do not dictate an output path, then the multiplexer examines the User Output Selection setting. This setting allows the administrator to control spooling for jobs that are not required to be sent direct to the printer or to the spooler. Thus, the multiplexer can efficiently direct the flow of print jobs and efficiently control the spooling and printing of print jobs.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for processing incoming print jobs, comprising:
examining job description attributes of a print job being received on a print channel and identifying the attribute of the print job;
identifying an attribute of the print channel associated with the incoming print job; and processing the incoming print job based upon the job description attribute of the incoming print job and the identification of the attribute of the print channel receiving the print job;

wherein the print channel attribute is MUST PRINT for print channels that provide bi-directional communication with a host and the print channel attribute is MAY SPOOL for Web Pull, Web Push, IPP, FTP, direct print ports, LPD, NetBIOS, NetWare, and Parallel type print control modules.

2. The method of claim 1 wherein the processing further comprises:

determining whether the job description attributes and the print channel attributes dictate an output path;

analyzing a state for a dictated output path when the job description attributes and the print channel attributes dictate an output path; and routing the incoming print job to the dictated path when the state of the dictated path is free.

3. The method of claim 2 further comprising signaling a stop flow command to halt the incoming print job when the state of the dictated path is busy.

4. The method of claim 3 further comprising restarting the incoming print job when the dictated path becomes available.

5. The method of claim 2 further comprising:

evaluating a setting for a user output selection when the job description attributes and the print channel attributes do not dictate an output path; and processing the incoming print job based upon the setting for the user output selection.

6. The method of claim 5 further comprising:

printing the incoming print job when the incoming print job is not required to be spooled because of the job description attributes or the print channel attributes and the setting of the user output selection is PRINT ALL;

spooling the incoming print job when the incoming print job is not required to be printed because of the job description attributes or the print channel attributes and the setting of the user output selection is SPOOL ALL;

printing the incoming print job when the printer is available, the incoming print job is not required to be printed because of the job description attributes or the print channel attributes and the setting of the user output selection is SPOOL WHEN BUSY; and spooling the incoming print job when the printer is busy, the incoming print job is not required to be printed because of the job description attributes or the print channel attributes and the setting of the user output selection is SPOOL WHEN BUSY.

7. The method of claim 1 wherein the print channel attribute is MUST PRINT for a IPDS port, Coax, Twinax, AppleTalk, Despooler and Internal Print type print control modules.

8. The method of claim 1 wherein the determining job description attributes of an incoming print job further comprises scanning a data stream for the incoming print job.

9. The method of claim 1, wherein a PDF file comprises a MUST SPOOL job description attribute.

10. The method of claim 9 wherein the PDF file is spooled to allow the PDF file to be converted to PostScript before printing.

11. The method of claim 1, wherein an IPDS file comprises a MUST PRINT job description attribute.

12. A multiplexer for processing incoming print jobs, comprising:

a multiplexer interface for examining job description attributes of a print job being received on a print channel and identifying the attribute of the print job and identifying an attribute of the print channel associated with the incoming print job; and a multiplexer processor component, interfaced with the multiplexer interface, for processing the incoming print job based upon the job description attribute of the incoming print job and the identification of the attribute of the print channel receiving the print job;

wherein the print channel attribute is MUST PRINT for print channels that provide bi-directional communication with a host and the print channel attribute is MAY SPOOL for Web Pull, Web Push, IPP, FTP, direct print ports, LPD, NetBIOS, NetWare, and Parallel type print control modules.

13. The multiplexer of claim 12 wherein the multiplexer processor component determines whether the job description attributes and the print channel attributes dictate an output path, analyzes a state for a dictated output path when the job description attributes and the print channel attributes dictate an output path and routes the incoming print job to the dictated path when the state of the dictated path is free.

14. The multiplexer of claim 13 wherein the multiplexer processor component signals a stop flow command to halt the incoming print job when the state of the dictated path is busy.

15. The multiplexer of claim 14 wherein the multiplexer processor component restarts the incoming print job when the dictated path becomes available.

16. The multiplexer of claim 13 further comprises a multiplexer output selector for receiving a user selection input to control spooling of jobs that are not required to be sent to a spooler or a print engine, wherein the multiplexer processor component evaluates a setting for a user output selection when the job description attributes and the print channel attributes do not dictate an output path and routes the incoming print job based upon the setting for the user output selection.

17. The multiplexer of claim 12 wherein the multiplexer processor component prints the incoming print job when the incoming print job is not required to be spooled because of the job description attributes or the print channel attributes and the setting of the user output selection is PRINT ALL, spools the incoming print job when the incoming print job is not required to be printed because of the job description attributes or the print channel attributes and the setting of the user output selection is SPOOL ALL, prints the incoming print job when the printer is available, the incoming print job is not required to be printed because of the job description attributes or the print channel attributes and the setting of the user output selection is SPOOL WHEN BUSY and spools the incoming print job when the printer is busy, the incoming print job is not required to be printed because of the job description attributes or the print channel attributes and the setting of the user output selection is SPOOL WHEN BUSY.

18. The multiplexer of claim 12 wherein the print channel attribute is MUST PRINT for a IPDS port, Coax, Twinax, AppleTalk, Despooler and Internal Print type print control modules.

19. The multiplexer of claim 12 wherein the print channel scans a data stream for the incoming print job to determine the job description attributes of the incoming print job.

20. The multiplexer of claim 12, wherein a PDF file comprises a MUST SPOOL job description attribute.

21. The multiplexer of claim 20 wherein the multiplexer processor component spools the PDF file to allow the PDF file to be converted to PostScript before printing.

22. The multiplexer of claim 12, wherein an IPDS file comprises a MUST PRINT job description attribute.

23. A print system, comprising:
a print engine for receiving a data stream for an incoming print job and generates print media based upon the data stream;
a spooler storing incoming print jobs until sent to the print engine; and
a system controller, coupled to the print engine and the spooler, for controlling the print engine, the spooler and the processing of incoming print jobs, the system controller including a multiplexer for managing the incoming print jobs, the multiplexer further comprising:
  a multiplexer interface for examining job description attributes of a print job being received on a print channel and identifying the attribute of the print job and identifying an attribute of the print channel associated with the incoming print job; and
  a multiplexer processor component, interfaced with the multiplexer interface, for processing the incoming print job based upon the job description attribute of the incoming print job and the identification of the attribute of the print channel receiving the print job;
wherein the print channel attribute is MUST PRINT for print channels that provide bi-directional communication with a host and the print channel attribute is MAY SPOOL for Web Pull Web Push, IPP, FTP, direct print ports, LPD, NetBIOS, NetWare, and Parallel type print control modules.

24. The print system of claim 23 wherein the multiplexer processor component determines whether the job description attributes and the print channel attributes dictate an output path, analyzes a state for a dictated output path when the job description attributes and the print channel attributes dictate an output path and routes the incoming print job to the dictated path when the state of the dictated path is free.

25. The print system of claim 24 wherein the multiplexer processor component signals a stop flow command to halt the incoming print job when the state of the dictated path is busy.

26. The print system of claim 25 wherein the multiplexer processor component restarts the incoming print job when the dictated path becomes available.

27. The print system of claim 24 further comprises a multiplexer output selector for receiving a user selection input to control spooling of jobs that are not required to be sent to a spooler or a print engine, wherein the multiplexer processor component evaluates a setting for a user output selection when the job description attributes and the print channel attributes do not dictate an output path and routes the incoming print job based upon the setting for the user output selection.

28. The print system of claim 27 wherein the multiplexer processor component prints the incoming print job when the incoming print job is not required to be spooled because of the job description attributes or the print channel attributes and the setting of the user output selection is PRINT ALL, spools the incoming print job when the incoming print job is not required to be printed because of the job description attributes or the print channel attributes and the setting of the user output selection is SPOOL ALL, prints the incoming print job when the printer is available, the incoming print job is not required to be printed because of the job description attributes or the print channel attributes and the setting of the user output selection is SPOOL WHEN BUSY and spools the incoming print job when the printer is busy, the incoming print job is not required to be printed because of the job description attributes or the print channel attributes and the setting of the user output selection is SPOOL WHEN BUSY.

29. The print system of claim 23 wherein the print channel attribute is MUST PRINT for a IPDS port, Coax, Twinax, AppleTalk, Despooler and Internal Print type print control modules.

30. The print system of claim 23 wherein the print channel scans a data stream for the incoming print job to determine the job description attributes of the incoming print job.

31. The print system of claim 23, wherein a PDF file comprises a MUST SPOOL job description attribute.

32. The print system of claim 31 wherein the multiplexer processor component spools the PDF file to allow the PDF file to be converted to PostScript before printing.

33. The print system of claim 23, wherein an IPDS file comprises a MUST PRINT job description attribute.

* * * * *